(12) United States Patent
Kawashima et al.

(10) Patent No.: US 8,299,195 B2
(45) Date of Patent: Oct. 30, 2012

(54) ETHYLENE HOMOPOLYMER

(75) Inventors: Yasutoyo Kawashima, Ichihara (JP); Koei Suita, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/865,631

(22) PCT Filed: Feb. 17, 2009

(86) PCT No.: PCT/JP2009/053127
§ 371 (c)(1), (2), (4) Date: Jul. 30, 2010

(87) PCT Pub. No.: WO2009/104782
PCT Pub. Date: Aug. 27, 2009

(65) Prior Publication Data
US 2010/0311934 A1    Dec. 9, 2010

(30) Foreign Application Priority Data
Feb. 20, 2008 (JP) ................. 2008-038497

(51) Int. Cl.
*C08F 10/02* (2006.01)
*C08F 4/6592* (2006.01)

(52) U.S. Cl. ...... 526/352; 526/160; 526/348; 526/348.6
(58) Field of Classification Search .................. 526/348, 526/348.6, 352
See application file for complete search history.

(56) References Cited

U.S. PATENT DOCUMENTS

| 5,585,448 A | 12/1996 | Resconi et al. |
| 5,594,080 A | 1/1997 | Waymouth et al. |
| 2005/0245701 A1 | 11/2005 | Oshima et al. |

FOREIGN PATENT DOCUMENTS

| JP | 3-74415 A | 3/1991 |
| JP | 7-165813 A | 6/1995 |
| JP | 8-34819 A | 2/1996 |
| JP | 9-510745 A | 10/1997 |
| JP | 2005-126627 A | 5/2005 |
| JP | 2005-336446 A | 12/2005 |

OTHER PUBLICATIONS

Melillo et al., Journal of Molecular Catalysis 230 (2005) 29-33.*
Gianluca Melillo et al., "meso-Me2Si(1-indenyl)2ZrCl2/methylalumoxane catalyzed polymerization of the ethylene to ethyl-branched polyethylene", Journal of Molecular Catalysis A:Chemical, (2005), vol. 230, pp. 29-33.
International Search Report issued in PCT/JP2009/053127, dated Apr. 28, 2009.
Lorella Izzo et al., "Branched Polyethylene by Ethylene Homopolymerization with meso-Zirconocene Catalyst", Macromolecules, (1999), vol. 32, pp. 6913-6916.
International Search Report issued in PCT/JP2009/053128, dated Apr. 7, 2009.
International Search Report issued in PCT/JP2009/053130, dated May 19, 2009.
Jongsomjit et al., "Supporting Effects of Silica-Supported Methylaluminoxane (MAO) with Zirconocene Catalyst on Ethylene/ 1-Olefin Copolymerization Behaviors for Linear Low-Density Polyethylene (LLDPE) Production", Ind. Eng. Chem. Res., (2004) vol. 43, No. 24, pp. 7959-7963.
Viera Marques et al., "Copolymerization of ethylene and 1-octene by homogeneous and different supported metallocenic catalysts", Journal of Applied Polymer Science, (2001) vol. 82. No. 3., pp. 724-730.
US Notice of Allowance for U.S. Appl. No. 12/865,617 dated Feb. 17, 2012.
US Office Action for U.S. Appl. No. 12/865,572 dated Feb. 17, 2012.

* cited by examiner

*Primary Examiner* — Roberto Rabago
(74) *Attorney, Agent, or Firm* — Birch, Stewart, Kolasch & Birch, LLP

(57) ABSTRACT

The object is to provide an ethylene homopolymer which is high in proportion of unsaturated group at one terminal of polymer chain and proportion of vinylidene group in the number of unsaturated group at one terminal of polymer chain and controlled in branching structure. The ethylene homopolymer satisfies the following requirements (1)-(4): (1) the number of ethyl branch per 1000 carbon atoms is 8 or more, (2) the number of alkyl branches other than ethyl branch is 0.1 or less, (3) the proportions of terminal vinyl group and terminal vinylene group in terminal unsaturated group (sum of terminal vinyl group, terminal vinylene group and terminal vinylidene group) are as shown by terminal vinyl group/terminal unsaturated group<0.01 and terminal vinylene group/terminal unsaturated group<0.01, and (4) the ratio of terminal vinylidene group and terminal methyl group is terminal vinylidene group/terminal methyl group>0.90.

2 Claims, No Drawings

ETHYLENE HOMOPOLYMER

TECHNICAL FIELD

The present invention relates to an ethylene homopolymer.

BACKGROUND ART

High-pressure radical process has been known for long as a process for producing polyethylene having branching structure by polymerization of ethylene. According to this process, a low-density polyethylene having complicated branch structure including short-chain branches and long-chain branches is obtained by homopolymerization of ethylene. However, since the high-pressure radical process utilizes a radical reaction, the branching structure of the resulting ethylene polymer can hardly be controlled, and mechanical strength of the ethylene polymer is not necessarily satisfactory.

One terminal of each polymer chain of the ethylene homopolymer obtained by the high-pressure radical process is methyl group and another terminal is methyl group or unsaturated group due to the polymerization mechanism. It is known that there is vinyl group, vinylidene group or the like as one terminal of the polymer chain, and a polyethylene having vinylidene group structure at one terminal is higher in heat stability of resin at molding as compared with a polyethylene having vinyl group structure at one terminal (e.g., Patent Document 1).
[Patent Document 1] JP-A-8-34819

SUMMARY OF THE INVENTION

Problem to be Solved by the Invention

However, known ethylene homopolymers are not necessarily high in proportion of unsaturated group at one terminal of polymer chain and proportion of vinylidene group occupying the number of unsaturated group at one terminal of polymer chain, and thus further improvement in heat stability of resin at molding has been demanded. Moreover, there are problems that control of branching structure is difficult, and since they have a plurality of alkyl branches, mechanical strength is insufficient.

Under the circumstances, the problem to be solved by the present invention is to provide an ethylene homopolymer which is high in proportion of unsaturated group at one terminal of polymer chain and proportion of vinylidene group occupying the number of unsaturated group at one terminal of polymer chain and is controlled in branching structure.

Means for Solving the Problem

That is, the present invention relates to an ethylene homopolymer which satisfies the following requirements (1)-(4):

(1) the number of ethyl branch per 1000 carbon atoms is 8 or more, (2) the number of each of alkyl branches other than ethyl branch is 0.1 or less, (3) the proportion of terminal vinyl group and terminal vinylene group in terminal unsaturated groups (sum of terminal vinyl group, terminal vinylene group and terminal vinylidene group) are as shown by terminal vinyl group/terminal unsaturated group<0.01 and terminal vinylene group/terminal unsaturated group<0.01, and (4) the ratio of terminal vinylidene group and terminal methyl group is terminal vinylidene group/terminal methyl group>0.90.

Advantages of the Invention

The present invention can provide an ethylene homopolymer which is high in proportion of unsaturated group at one terminal of polymer chain and proportion of vinylidene group in the number of unsaturated group at one terminal of polymer chain.

EMBODIMENTS OF THE INVENTION

The ethylene homopolymer of the present invention has 8 or more ethyl branches per 1000 carbon atoms (requirement 1). Furthermore, the ethylene homopolymer of the present invention has 0.1 or less alkyl branch other than ethyl branch (requirement 2).

The ethylene homopolymer satisfying the above requirements (1) and (2) can be said to be an ethylene homopolymer having substantially only ethyl branch as branched chain. The ethylene homopolymer having 8 or more ethyl branches and 0.1 or less alkyl branch other than ethyl branch per 1000 carbon atoms means that when the ethylene homopolymer has methyl branch and butyl branch as alkyl branches other than ethyl branch, it has 0.1 or less methyl branch, 0.1 or less butyl branch and 8 or more ethyl branches per 1000 carbon atoms constituting the main chain of the ethylene homopolymer.

The number of ethyl branch of the ethylene homopolymer of the present invention is 8 or more per 1000 carbon atoms, and for increasing mechanical strength of the ethylene homopolymer, it is preferably 10 or more, more preferably 11 or more, further preferably 12 or more, especially preferably 13 or more, and most preferably 14 or more.

The number of each alkyl branch per 1000 carbon atoms of the ethylene homopolymer can be obtained by measuring carbon nuclear magnetic resonance spectrum ($^{13}$C-NMR) by carbon nuclear magnetic resonance method under the following conditions and carrying out calculation by the following calculation method.

<Measuring Conditions>

Apparatus: AVANCE 600 manufactured by Bruker Co., Ltd.

Measuring probe: 10 mm probe

Measuring solvent: Mixed solution of 1,2-dichlorobenzene/1,2-dichlorobenzene-d4=75/25 (volume ratio)

Measuring temperature: 130° C.

Measuring method: Proton decoupling method

Pulse width: 45°

Pulse repeating time: 4 seconds

Measuring standard: Tetramethylsilane

Window function: Positive exponential function

The number of integration: Integration is conducted until SN ratio of peaks observed at 32.0-32.2 ppm reaches 100 or more. As for the standard of noise, the area of 50-60 ppm is defined to be noise.

<Method for Calculation of the Number of Ethyl Branch>

When the sum total of integral values of all peaks observed at 5-50 ppm is assumed to be 1000, the sum of integral values of peaks observed at 39.5-40.0 ppm and integral values of peaks observed at 37.1-37.6 ppm is taken as the number of ethyl branch.

<Method for Calculation of the Number of Other Alkyl Branch>

When the sum total of integral values of all peaks observed at 5-50 ppm is assumed to be 1000, the integral value of peaks observed at 19-20 ppm is taken as the number of methyl branch, the integral value of peaks observed at 14.3-14.8 ppm is taken as the number of propyl branch, and the sum of integral values of peaks observed at 38.0-38.5 ppm is taken as the number of branch of 4 or more carbon atoms.

The proportion of terminal vinyl group in terminal unsaturated group (sum of terminal vinyl group, terminal vinylene group and terminal vinylidene group) of the ethylene homopolymer of the present invention is as shown by usually terminal vinyl group/terminal unsaturated group<0.01, preferably terminal vinyl group/terminal unsaturated group<0.005, and more preferably terminal vinyl group/terminal unsaturated group<0.001 for increasing heat stability at molding.

The proportion of terminal vinylene group in terminal unsaturated group (sum of terminal vinyl group, terminal vinylene group and terminal vinylidene group) of the ethylene homopolymer of the present invention is as shown by usually terminal vinylene group/terminal unsaturated group<0.01, preferably terminal vinylene group/terminal unsaturated group<0.005, and more preferably terminal vinylene group/terminal unsaturated group<0.001 for increasing heat stability at molding.

The ratio of terminal vinylidene group and terminal methyl group of the ethylene homopolymer of the present invention is usually terminal vinylidene group/terminal methyl group>0.90, and for attaining easy modification, the ratio is preferably terminal vinylidene group/terminal methyl group>0.92, more preferably terminal vinylidene group/terminal methyl group>0.94, further preferably terminal vinylidene group/terminal methyl group>0.95, most preferably terminal vinylidene group/terminal methyl group>0.96.

The terminal methyl group means a methyl group at saturated terminal group of polymer chain.

The ratio of terminal vinylidene group and terminal methyl group in the ethylene homopolymer of the present invention can be obtained by measuring carbon nuclear magnetic resonance spectrum ($^{13}$C-NMR) by carbon nuclear magnetic resonance method under the following conditions and carrying out calculation by the following calculation method.

<Measuring Conditions>

Apparatus: AVANCE 600 manufactured by Bruker Co., Ltd.

Measuring probe: 10 mm probe

Measuring solvent: Mixed solution of 1,2-dichlorobenzene/1,2-dichlorobenzene-d4=75/25 (volume ratio)

Measuring temperature: 130° C.

Measuring method: Proton decoupling method

Pulse width: 45°

Pulse repeating time: 4 seconds

Measuring standard: Tetramethylsilane

Window function: Positive exponential function

The number of integration: Integration is conducted until SN ratio of peaks observed at 32.0-32.2 ppm reaches 100 or more. As for the standard of noise, the area of 50-60 ppm is defined to be noise.

<Method of Calculation>

The integral value of peaks observed at 36.4-36.6 ppm is taken as terminal vinylidene group and the integral value of peaks observed at 32.0-32.2 ppm is taken as terminal methyl group, and the value of terminal vinylidene group/terminal methyl group is obtained.

The ratio of terminal vinyl group and terminal unsaturated group and the ratio of terminal vinylene group and terminal unsaturated group in the ethylene homopolymer of the present invention can be obtained by measuring proton nuclear magnetic resonance spectrum ($^1$H-NMR) by proton nuclear magnetic resonance method under the following conditions and carrying out calculation by the following calculation method.

<Measuring Conditions>

Apparatus: EX270 manufactured by Nippon Denshi Co., Ltd.

Measuring probe: 5 mm probe

Measuring solvent: 1,2-dichlorobenzene-d4

Measuring temperature: 130° C.

Pulse width: 30°

Pulse repeating time: 7 seconds

Measuring standard: Tetramethylsilane

The number of integration: 64 times

<Method of Calculation>

The integral value of peaks observed at 4.86-5.02 ppm is taken as terminal vinyl group and sum of the integral values of peaks observed at 4.64-4.80 ppm (vinylidene), 4.86-5.02 ppm (vinyl), 5.30-5.53 (trans-vinylene) is taken as terminal unsaturated group, and the value of terminal vinyl group/terminal unsaturated group is obtained.

Furthermore, the integral value of peaks observed at 5.30-5.53 ppm is taken as terminal vinylene group and sum of the integral values of peaks observed at 4.64-4.80 ppm (vinylidene), 4.86-5.02 ppm (vinyl), 5.30-5.53 (trans-vinylene) is taken as terminal unsaturated group, and the value of terminal vinylene group/terminal unsaturated group is obtained.

The terminal vinylidene group in the present invention can be represented by the following formula (I).

$$PR^4C{=}CH_2 \qquad (I)$$

(P is a polymer chain in the ethylene homopolymer, and $R^4$ is a hydrocarbon group.).

The terminal vinyl group in the present invention can be represented by the following formula (II).

$$PHC{=}CH_2 \qquad (II)$$

(P is a polymer chain in the ethylene homopolymer.).

The terminal vinylene group in the present invention can be represented by the following formula (III).

$$PHC{=}CHR^4 \qquad (III)$$

(P is a polymer chain in the ethylene homopolymer, and $R^4$ is a hydrocarbon group.).

The hydrocarbon groups of $R^4$ include, for example, alkyl group, aralkyl group, aryl group and alkenyl group.

Examples of alkyl group are methyl group, ethyl group, n-propyl group, isopropyl group, n-butyl group, sec-butyl group, tert-butyl group, isobutyl group, n-pentyl group, neopentyl group, amyl group, n-hexyl group, n-octyl group, n-decyl group, n-dodecyl group, n-pentadecyl group, n-eicosyl group, etc. When a chain transfer agent is used in ethylene polymerization, the terminal alkyl group in the resulting ethylene homopolymer may be substituted with a halogen atom such as fluorine atom, chlorine atom, bromine atom, or iodine atom originating from the chain transfer agent. Examples of the alkyl group substituted with halogen atom are fluoromethyl group, trifluoromethyl group, chloromethyl group, trichloromethyl group, fluoroethyl group, pentafluoroethyl group, perfluoropropyl group, perfluorobutyl group, perfluorohexyl group, perfluorooctyl group, perchloropropyl group, perchlorobutyl group, perbromopropyl group, etc. Furthermore, the alkyl group may be partially substituted with an alkoxy group such as methoxy group or ethoxy group; an aryloxy group such as phenoxy group; an aralkyloxy group such as benzyloxy group; or the like.

The alkyl group is preferably methyl group, ethyl group and butyl group.

Examples of the aralky group are benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, naphthylmethyl group, and anthracenylmethyl group. When a chain transfer agent is used in ethylene polymerization, the terminal aralkyl group in the resulting ethylene homopolymer may be substituted with a halogen atom such as fluorine atom, chlorine atom, bromine atom, or iodine atom originating from the chain transfer agent; an alkoxy group such as methoxy group or ethoxy group; an aryloxy group such as phenoxy group; an aralkyloxy group such as benzyloxy group; or the like.

Examples of the aryl group are phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, and anthracenyl group. When a chain transfer agent is used in ethylene polymerization, the terminal aryl group in the resulting ethylene homopolymer may be partially substituted with a halogen atom such as fluorine atom, chlorine atom, bromine atom, or iodine atom originating from the chain transfer agent; an alkoxy group such as methoxy group or ethoxy group; an aryloxy group such as phenoxy group; an aralkyloxy group such as benzyloxy group; or the like.

The hydrocarbon group is preferably methyl group, ethyl group and butyl group, and more preferably ethyl group.

The terminal vinylidene group of the ethylene homopolymer of the present invention is preferably terminal ethylvinylidene group.

The intrinsic viscosity [η] of the ethylene homopolymer of the present invention is preferably 0.3 or higher, more preferably 0.4 or higher, and further preferably 0.5 or higher for increasing mechanical strength of the ethylene homopolymer.

The intrinsic viscosity [η] of ethylene homopolymer can be obtained by the following method.

A tetralin solution in which 2,6-di-t-butyl-p-cresol (BHT) is dissolved at a concentration of 0.5 g/L (hereinafter referred to as blank solution) and a solution prepared by dissolving ethylene polymer in the blank solution at a concentration of 1 mg/ml (hereinafter referred to as sample solution) are prepared. The falling time of the blank solution and that of the sample solution at 135° C. are measured by Ubbellohde viscometer, and relative viscosity [ηrel] at 135° C. is obtained from the falling time. Then, the intrinsic viscosity [η] is calculated from the following formula.

[η]=23.3×log(ηrel)

The ethylene homopolymer of the present invention can be produced using the catalyst component for ethylene polymerization which is obtained by contacting the following components (A) and (B).

Component (A): meso-metallocene compound
Component (B): a compound which ionizes a metallocene compound to form an ionic complex.

The meso-metallocene compound of the component (A) is a transition metal compound which has a meso-cyclopentadienyl type anion skeleton and is represented by the following formula (1).

$$L_2MX_2 \qquad (1)$$

M is a transition metal atom of Group 4 in the periodic table. L is a group having a cyclopentadiene type anion skeleton, and two Ls are linked with each other through a crosslinking group containing one or two or more of carbon atom, silicon atom and germanium atom and are coordinated in meso form. X is a halogen atom, a hydrocarbon group (excluding group having cyclopentadiene type anion skeleton) or a hydrocarbonoxy group.

M in the formula (1) is a transition metal atom of Group 4 in the periodic table (IUPAC 1989), and is preferably titanium atom, zirconium atom or hafnium atom, and more preferably zirconium atom.

L in the formula (1) is a group having a cyclopentadiene type anion skeleton, and two Ls may be the same or different. Moreover, two Ls are linked with each other through a crosslinking group containing carbon atom, silicon atom and germanium atom and are coordinated in meso form.

The group having a cyclopentadiene type anion skeleton in L is a $\eta^5$-(substituted) indenyl group, and specific examples thereof are $\eta^5$-indenyl group, $\eta^5$-4,5,6,7-tetrahydroindenyl group, $\eta^5$-2-methylindenyl group, $\eta^5$-3-methylindenyl group, $\eta^5$-4-methylindenyl group, $\eta^5$-5-methylindenyl group, $\eta^5$-6-methylindenyl group, $\eta^5$-7-methylindenyl group, $\eta^5$-2-tert-butylindenyl group, $\eta^5$-3-tert-butylindenyl group, $\eta^5$-4-tert-butylindenyl group, $\eta^5$-5-tert-butylindenyl group, tert-butylindenyl group, $\eta^5$-7-tert-butylindenyl group, $\eta^5$-2,3-dimethylindenyl group, $\eta^5$-2,4,7-trimethylindenyl group, $\eta^5$-2-methyl-4-isopropylindenyl group, $\eta^5$-4,5-benzindenyl group, $\eta^5$-4-phenylindenyl group, methyl-5-phenylindenyl group, $\eta^5$-2-methyl-4-phenylindenyl group, $\eta^5$-2-methyl-4-naphthylindenyl group, $\eta^5$-3-benzylindenyl group, and these groups which are substituted. In this specification, "$\eta^5$" in the names of transition metal compounds is sometimes omitted.

The groups having a cyclopentadiene type anion skeleton are linked with each other through a crosslinking group containing one or two or more of carbon atoms, silicon atoms and germanium atoms. These crosslinking groups include, for example, alkylene groups such as ethylene group and propylene group; substituted alkylene groups such as dimethylmethylene group and diphenylmethylene group; substituted silylene groups such as silylene group, dimethylsilylene group, diphenylsilylene group and tetramethyldisilylene group; germylene groups such as dimethylgermylene group and diphenylgermylene group; and the like.

The meso-metallocene compound of the component (A) is preferably a transition metal compound having a meso-indene type anion skeleton and is represented by the following formula (2).

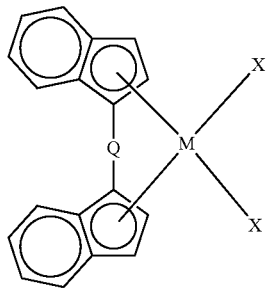

[in the formula, M is a transition metal atom of Group 4 in the periodic table, X is a halogen atom, a hydrocarbon group (excluding group having cyclopentadiene type anion skeleton) or a hydrocarbonoxy group, and the indenyl skeletons are linked through a crosslinking group Q represented by the following formula (3) and are coordinated in meso form. A plurality of X may be the same or different.

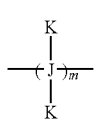

(in the formula, m is an integer of 1-5, J represents an atom of Group 14 in the periodic table, K is a hydrogen atom, a halogen atom, a hydrocarbon group (excluding group having cyclopentadiene type anion skeleton), a hydrocarbon group substituted with a substituted silyl group or a hydrocarbon group substituted with a substituted amino group, and a plurality of J may be the same or different. A plurality of K may be the same or different)].

In the formula (3), J is an atom of Group 14 in the periodic table (IUPAC 1989) and is carbon atom, silicon atom or germanium atom. J is more preferably carbon atom or silicon atom. A plurality of J may be the same or different.

X in the formula (1) and (2) is a halogen atom, a hydrocarbon group (excluding the group having cyclopentadiene type anion skeleton) or a hydrocarbonoxy group. Specific examples of the halogen atom are fluorine atom, chlorine atom, bromine atom and iodine atom. The hydrocarbon group here does not include the group having cyclopentadiene type anion skeleton. Examples of the hydrocarbon group are alkyl groups, aralkyl groups, aryl groups, alkenyl groups, etc. Examples of the hydrocarbonoxy group are alkoxy groups, aralkyloxy groups, aryloxy groups, etc. A plurality of X may be the same or different.

K in the formula (3) is a hydrogen atom, a halogen atom, a hydrocarbon group (excluding group having cyclopentadiene type anion skeleton), a hydrocarbonoxy group, a hydrocarbon group substituted with a substituted silyl group or a hydrocarbon group substituted with a substituted amino group. Examples of the halogen atom are fluorine atom, chlorine atom, bromine atom and iodine atom. The hydrocarbon group here does not include group having cyclopentadiene type anion skeleton. Examples of the hydrocarbon group here are alkyl groups, aralkyl groups, aryl groups, alkenyl groups, etc., and examples of the hydrocarbonoxy group are alkoxy groups, aralkyloxy groups, aryloxy groups, etc. A plurality of K may be the same or different.

The alkyl group in X and K includes, for example, methyl group, ethyl group, n-propyl group, isopropyl group, n-butyl group, sec-butyl group, tert-butyl group, isobutyl group, n-pentyl group, neopentyl group, amyl group, n-hexyl group, n-octyl group, n-decyl group, n-dodecyl group, n-pentadecyl group, n-eicosyl group, etc. These alkyl groups may be substituted with a halogen atom such as fluorine atom, chlorine atom, bromine atom, or iodine atom. Examples of the alkyl groups substituted with halogen atom are fluoromethyl group, trifluoromethyl group, chloromethyl group, trichloromethyl group, fluoroethyl group, pentafluoroethyl group, perfluoropropyl group, perfluorobutyl group, perfluorohexyl group, perfluorooctyl group, perchloropropyl group, perchlorobutyl group, perbromopropyl group, etc. Furthermore, these alkyl groups may be partially substituted with an alkoxy group such as methoxy group or ethoxy group; an aryloxy group such as phenoxy group; an aralkyloxy group such as benzyloxy group; or the like.

The aralky group in X and K includes, for example, benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, naphthylmethyl group, and anthracenylmethyl group, and these aralkyl groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The aryl group in X and K includes, for example, phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, and anthracenyl group, and these aryl groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The alkenyl group in X and K includes, for example, allyl group, methallyl group, crotyl group and 1,3-diphenyl-2-propenyl group.

The alkoxy group in X and K includes, for example, methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodesoxy group, n-pentadesoxy group, and n-icosoxy group, and these alkoxy groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The aralkyloxy group in X and K includes, for example, benzyloxy group, (2-methylphenyl)methoxy group, (3-methylphenyl)methoxy group, (4-methylphenyl)methoxy group, (2,3-dimethylphenyl)methoxy group, (2,4-dimethylphenyl) methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl) methoxy group, (2,3,6-trimethylphenyl)methoxy group, (2,4,5-trimethylphenyl)methoxy group, (2,4,6-trimethylphenyl) methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl) methoxy group, (ethylphenyl)methoxy group, (n-propylphenyl)methoxy group, (isopropylphenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, naphthylmethoxy group, and anthracenylmethoxy group, and these aralkyloxy groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The aryloxy group in X and K includes, for example, phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2-tert-butyl-3-methylphenoxy group, 2-tert-butyl-4-methylphenoxy group, 2-tert-butyl-5-methylphenoxy group, 2-tert-butyl-6-methylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 2-tert-butyl-3,4-dimethylphenoxy group, 2-tert-butyl-3,5-dimethylphenoxy group, 2-tert-butyl-3,6-dimethylphenoxy group, 2,6-di-tert-butyl-3-methylphenoxy group, 2-tert-butyl-4,5-dimethylphenoxy group, 2,6-di-tert-butyl-4-methylphenoxy group, 3,4,5-trimethylphenoxy group, 2,3,4,5-tetramethylphenoxy group, 2-tert-butyl-3,4,5-trimethylphenoxy group, 2,3,4,6-tetramethylphenoxy group, 2-tert-butyl-3,4,6-trimethylphenoxy group, 2,6-di-tert-butyl-3,4-dimethylphenoxy group, 2,3,5,6-tetramethylphenoxy group, 2-tert-butyl-3,5,6-trimethylphenoxy group, 2,6-di-tert-butyl-3,5-dimethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, and anthracenoxy group, and these aryloxy groups may be partially substituted with a halogen atom such as fluorine atom, chlorine atom, bromine atom or iodine atom; an alkoxy group such as methoxy group or ethoxy group; an aryloxy group such as phenoxy group; an aralkyloxy group such as benzyloxy group; or the like.

The hydrocarbon groups substituted with a substituted silyl group in K include, for example, trimethylsilylmethyl group, trimethylsilylethyl group, trimethylsilylpropyl group, trimethylsilylbutyl group, trimethylsilylphenyl group, bis(trimethylsilyl)methyl group, bis(trimethylsilyl)ethyl group, bis(trimethylsilyl)propyl group, bis(trimethylsilyl)butyl group, bis(trimethylsilyl)phenyl group, and triphenylsilylmethyl group.

The hydrocarbon groups substituted with a substituted amino group in K include, for example, dimethylaminomethyl group, dimethylaminoethyl group, dimethylaminopropyl group, dimethylaminobutyl group, dimethylaminophenyl group, bis(dimethylamino)methyl group, bis(dimethylamino)ethyl group, bis(dimethylamino)propyl group, bis(dimethylamino)butyl group, bis(dimethylamino)phenyl group, phenylaminomethyl group, diphenylaminomethyl group, and diphenylaminophenyl group.

Examples of the crosslinking group Q include, for example, alkylene groups such as ethylene group and propylene group; substituted alkylene groups such as dimethylmethylene group and diphenylmethylene group; substituted silylene groups such as silylene group, dimethylsilylene group, diphenylsilylene group and tetramethyldisilylene group; and germylene groups such as dimethylgermylene group and diphenylgermylene group.

As the specific examples of meso-metallocene compounds containing a group having a structure of two cyclopentadienyl type anion skeletons being bonded through a crosslinking group, mention may be made of titanium compounds such as meso-dimethylsilylenebis(indenyl)titanium dichloride, meso-dimethylsilylenebis(2-methylindenyl)titanium dichloride, meso-dimethylsilylenebis(2-tert-butylindenyl)titanium dichloride, meso-dimethylsilylenebis(2,3-dimethylindenyl) titanium dichloride, meso-dimethylsilylenebis(2,4,7-trimethylindenyl)titanium dichloride, meso-dimethylsilylenebis (2-methyl-4-isopropylindenyl)titanium dichloride, meso-dimethylsilylenebis(4,5-benzindenyl)titanium dichloride, meso-dimethylsilylenebis(2-phenylindenyl) titanium dichloride, meso-dimethylsilylenebis(4-phenylindenyl)titanium dichloride, meso-dimethylsilylenebis(2-methyl-4-phenylindenyl)titanium dichloride, meso-dimethylsilylenebis(2-methyl-5-phenylindenyl)titanium dichloride, meso-dimethylsilylenebis(2-methyl-4-naphthylindenyl)titanium dichloride, meso-dimethylsilylenebis(3-benzylindenyl)titanium dichloride, meso-dimethylsilylene(indenyl)(3-benzylindenyl)titanium dichloride, meso-dimethylsilylenebis(4,5,6,7-tetrahydroindenyl)titanium dichloride, etc; zirconium compounds such as meso-dimethylsilylenebis(indenyl)zirconium dichloride, meso-dimethylsilylenebis(2-methylindenyl)zirconium dichloride, meso-dimethylsilylenebis(2-tert-butylindenyl) zirconium dichloride, meso-dimethylsilylenebis(2,3-dimethylindenyl)zirconium dichloride, meso-dimethylsilylenebis (2,4,7-trimethylindenyl)zirconium dichloride, meso-dimethylsilylenebis(2-methyl-4-isopropylindenyl) zirconium dichloride, meso-dimethylsilylenebis(4,5-benzindenyl)zirconium dichloride, meso-dimethylsilylenebis(2-phenylindenyl)zirconium dichloride, meso-dimethylsilylenebis(4-phenylindenyl)zirconium dichloride, meso-dimethylsilylenebis(2-methyl-4-phenylindenyl)zirconium dichloride, meso-dimethylsilylenebis(2- methyl-5-phenylindenyl)zirconium dichloride, meso-dimethylsilylenebis(2-methyl-4-naphthylindenyl)zirconium dichloride, meso-dimethylsilylenebis(3-benzylindenyl)zirconium dichloride, meso-dimethylsilylene(indenyl)(3-benzylindenyl)zirconium dichloride, meso-dimethylsilylenebis(4,5,6,7-tetrahydroindenyl)zirconium dichloride, etc.; and hafnium compounds such as meso-dimethylsilylenebis(indenyl)hafnium dichloride, meso-dimethylsilylenebis(2-methylindenyl)hafnium dichloride, meso-dimethylsilylenebis(2-tert-butylindenyl)hafnium dichloride, meso-dimethylsilylenebis(2,3-dimethylindenyl)hafnium dichloride, meso-dimethylsilylenebis(2,4,7-trimethylindenyl)hafnium dichloride, meso-dimethylsilylenebis(2-methyl-4-isopropylindenyl)hafnium dichloride, meso-dimethylsilylenebis(4,5-benzindenyl)hafnium dichloride, meso-dimethylsilylenebis(2-phenylindenyl)hafnium dichloride, meso-dimethylsilylenebis(4-phenylindenyl)hafnium dichloride, meso-dimethylsilylenebis(2-methyl-4-phenylindenyl)hafnium dichloride, meso-dimethylsilylenebis(2-methyl-5-phenylindenyl)hafnium dichloride, meso-dimethylsilylenebis(2-methyl-4-naphthylindenyl)hafnium dichloride, meso-dimethylsilylenebis(3-benzylindenyl)hafnium dichloride, meso-dimethylsilylene(indenyl)(3-benzylindenyl)hafnium dichloride, meso-dimethylsilylenebis(4,5,6,7-tetrahydroindenyl)hafnium dichloride, etc. In the above compounds, dimethylsilylene may be changed to methylene, ethylene, dimethylmethylene(isopropylidene), diphenylmethylene, diethylsilylene, diphenylsilylene, dimethoxysilylene, dimethylgermylene or diphenylgermylene, and dichloride may be changed to difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide).

The meso-metallocene compounds of the component (A) are preferably those which contain a group having a structure where two cyclopentadienyl type anion skeletons are bonded through a crosslinking group such as alkylene group or silylene group.

The cyclopentadienyl type anion skeletons are preferably indenyl group, methylindenyl group and benzylindenyl group, and indenyl group is more preferred, and the crosslinking groups are preferably ethylene group, dimethylmethylene group and dimethylsilylene group, and dimethylsilylene group is more preferred. More preferred meso-metallocene compounds are meso-ethylenebis(1-indenyl)zirconium dichloride and meso-dimethylsilylenebis(1-indenyl)zirconium dichloride, and as further preferred meso-metallocene compounds, mention may be made of meso-dimethylsilylenebis(1-indenyl)zirconium dichloride.

These transition metal compounds may be used each alone or in combination of two or more.

The component (B) is a compound which ionizes a metallocene compound to form an ionic complex.

As the compound which ionizes a metallocene compound to form an ionic complex, mention may be made of organoaluminumoxy compounds and/or boron compounds.

The organoaluminumoxy compounds include cyclic aluminoxanes having a structure represented by the following formula (4), linear aluminoxanes having a structure represented by the following formula (5), modified aluminoxane compounds obtained by reacting the compound of the formula (4) and/or (5) with a compound having hydroxyl group, and the like. (In the formulas, $R^1$ and $R^2$ are hydrocarbon groups, and all $R^1$s and all $R^2$s may be the same or different, a denotes an integer of 2 or more, and b denotes an integer of 1 or more.) The hydrocarbon groups of $R^1$ and $R^2$ are preferably hydrocarbon groups of 1-8 carbon atoms and more preferably alkyl groups.

Specific examples of $R^1$ and $R^2$ in the cyclic aluminoxanes having a structure represented by the formula (4) and the linear aluminoxanes having a structure represented by the formula (5) are alkyl groups such as methyl group, ethyl group, n-propyl group, isopropyl group, n-butyl group, isobutyl group, n-pentyl group, and neopentyl group. The suffix a denotes an integer of 2 or more and suffix b denotes an integer of 1 or more. Preferably, $R^1$ and $R^2$ are methyl group or isobutyl group, and a is 2-40, and b is 1-40.

The above aluminoxane is produced by various processes. The processes are not particularly limited, and it is produced in accordance with known processes. For example, it is produced by contacting with water a solution prepared by dissolving a trialkylaluminum (e.g., trimethylaluminum) in a suitable organic solvent (such as benzene or aliphatic hydrocarbon). Furthermore, there may be used a process of contacting a trialkylaluminum (e.g., trimethylaluminum) and a metal salt containing water of crystallization (e.g., hydrated copper sulfate). The aluminoxane obtained in this way or a commercially available aluminoxane is considered to be usually a mixture of aluminoxanes of the formulas (4) and (5).

It is also preferred to use a modified aluminoxane compound formed by reacting the above aluminoxanes (aluminoxanes of the formulas (4) and/or (5)) with a compound having hydroxyl group. The compounds having hydroxyl group include alcohol, phenol or silanol.

Specific examples of the organoaluminumoxy compounds are methylaluminoxane, methylisobutylaluminoxane, etc.

The boron compounds include, for example, tris(pentafluorophenyl)borane, triphenylcarbeniumtetrakis(pentafluorophenyl) borate, tri(n-butyl)ammoniumtetrakis(pentafluorophenyl) borate, and N,N-dimethylaniliniumtetrakis(pentafluorophenyl) borate.

The compound which ionizes a metallocene compound to form an ionic complex is preferably an organoaluminumoxy compound.

The compound of component (B) which forms an ionic complex by ionization of metallocene compound may be supported on a particulate carrier. The particulate carrier is preferably a porous material, and there may be used inorganic oxides such as $SiO_2$, $Al_2O_3$, $MgO$, $ZrO_2$, $TiO_2$, $B_2O_3$, $CaO$, $ZnO$, $BaO$ and $ThO_2$; clays or clay minerals such as smectite, montmorillonite, hectorite, laponite and saponite; organic polymers such as polyethylene, polypropylene and styrene-divinylbenzene copolymer; and the like. The 50% volume average particle diameter of the particulate carrier is usually 10-500 μm, and is measured by light scattering laser diffraction method or the like. The pore volume of the particulate carrier is usually 0.3-10 ml/g, and the specific surface area is usually 10-1000 $m^2$/g. The pore volume and specific surface area are measured by gas adsorption method, and the pore volume is obtained by analyzing the gas desorption amount according to BJH method, and the specific surface area is obtained by analyzing the gas absorption amount according to BET method.

The particulate carrier is preferably dried to substantially remove water, and is preferably dried by heating. With reference to the particulate carrier in which water cannot be recognized by visual observation, the drying temperature is usually from 100 to 1500° C., preferably from 100 to 1000° C., more preferably from 200 to 800° C. The heating time is not particularly limited, and is preferably 10 minutes-50 hours, more preferably 1-30 hours. As the method for drying by heating, there may be used a method of drying by flowing dried inert gas (e.g., nitrogen or argon) at a specific flow rate during heating or a method of carrying out heating and drying under reduced pressure.

The method of supporting the compound of the component (B) which forms an ionic complex by ionization of metallocene compound may be any methods of contacting the compound which forms an ionic complex by ionization of metallocene compound with the particulate carrier, and an example of the methods is to contact them by mixing in a solvent. Further, there may be employed a method of preparing the compound which forms an ionic complex by ionization of metallocene compound in the presence of the particulate carrier.

The contact treatment of the compound which ionizes a metallocene compound to form an ionic complex with the particulate carrier is carried out preferably in an inert gas atmosphere. The treating temperature is usually from −100° C. to +300° C., preferably from −80° C. to +200° C. The treating time is usually 1 minute to 200 hours, preferably 10 minutes to 100 hours. The contact treatment can be carried out using a solvent or can be directly carried out without using solvent.

As the solvent used for contact treatment, there may be used a solvent inert for the compound which ionizes metallocene compound to form an ionic complex, and hydrocarbon solvents are usually used. Examples thereof are saturated hydrocarbon solvents such as butane, pentane, hexane, heptane, octane, 2,2,4-trimethylpentane and cyclohexane; and aromatic hydrocarbon solvents such as benzene, toluene and xylene.

In producing the ethylene homopolymer of the present invention, an organoaluminum compound may be used together as component (C) in addition to the components (A) and (B). Particularly, when the component (B) is a boron compound, the ethylene homopolymer of the present invention can be obtained by using the component (C) together.

As the organoaluminum compound of the component (C), known organoaluminum compound may be used. Preferred is an organoaluminum compound represented by the following formula (6).

$$R^3_c AlY_{3-c} \quad (6)$$

(in the formula, R represents a hydrocarbon group, and all $R^3$s may be the same or different, Y represents hydrogen atom, a halogen atom, an alkoxy group, an aralkyloxy group or an aryloxy group, and all Ys may be the same or different, and c represents a numeral satisfying $0 < c \leq 3$).

In the formula (6) representing the organoaluminum compound, $R^3$ is preferably a hydrocarbon group of 1-24 carbon atoms, and more preferably an alkyl group of 1-24 carbon atoms. Specific examples are methyl group, ethyl group, n-propyl group, n-butyl group, isobutyl group, n-hexyl group, 2-methylhexyl group and n-octyl group, and preferred are ethyl group, n-butyl group, isobutyl group, n-hexyl group and n-octyl group.

Examples of halogen atom of Y are fluorine atom, chlorine atom, bromine atom, and iodine atom, and chlorine atom is preferred.

The alkoxy group in Y is preferably an alkoxy group of 1-24 carbon atoms. Specific examples are methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodesoxy group, n-pentadesoxy group, and n-icosoxy group, and preferred are methoxy group, ethoxy group and tert-butoxy group.

The aryloxy group in Y is preferably an aryloxy group of 6-24 carbon atoms. Specific examples thereof are phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, and anthracenoxy group.

The aralkyloxy group in Y is preferably an aralkyloxy group of 7-24 carbon atoms. Specific examples thereof are benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, and anthracenylmethoxy group. Benzyloxy group is preferred.

Specific examples of the organoaluminum compounds represented by the formula (6) are trialkylaluminums such as trimethylaluminum, triethylaluminum, tri-n-propylaluminum, tri-n-butylaluminum, triisobutylaluminum, tri-n-hexylaluminum and tri-n-octylaluminum; dialkylaluminum chlorides such as dimethylaluminum chloride, diethylaluminum chloride, di-n-propylaluminum chloride, di-n-butylaluminum chloride, diisobutylaluminum chloride and di-n-hexylaluminum chloride; alkylaluminum dichlorides such as methylaluminum dichloride, ethylaluminum dichloride, n-propylaluminum dichloride, n-butylaluminum dichloride, isobutylaluminum dichloride and n-hexylaluminum dichloride; dialkylaluminum hydrides such as dimethylaluminum hydride, diethylaluminum hydride, di-n-propylaluminum hydride, di-n-butylaluminum hydride, diisobutylaluminum hydride and di-n-hexylaluminum hydride; alkyl(dialkoxy)aluminums such as methyl(dimethoxy)aluminum, methyl(diethoxy)aluminum and methyl(di-tert-butoxy)aluminum; dialkyl(alkoxy)aluminums such as dimethyl(methoxy)aluminum, dimethyl(ethoxy)aluminum and dimethyl(tert-butoxy)aluminum; alkyl(diaryloxy)aluminums such as methyl (diphenoxy)aluminum, methylbis(2,6-diisopropylphenoxy)aluminum and methylbis(2,6-diphenylphenoxy)aluminum; dialkyl(aryloxy)aluminums such as dimethyl(phenoxy)aluminum, dimethyl(2,6-diisopropylphenoxy)aluminum and dimethyl(2,6-diphenylphenoxy)aluminum.

Among them, preferred are trialkylaluminums, more preferred are trimethylaluminum, triethylaluminum, tri-n-butylaluminum, triisobutylaluminum, tri-n-hexylaluminum and tri-n-octylaluminum, and especially preferred are triisobutylaluminum, triethylaluminum and tri-n-octylaluminum.

These organoaluminum compounds may be used each alone or in combination of two or more.

The method for feeding the catalyst components to a reactor for preparation of catalyst or a reactor for polymerization is also not particularly limited. There are, for example, a method of feeding each component in solid state, a method of feeding each component in the state of solution prepared by dissolving the component in a hydrocarbon solvent from which components deactivating the catalyst component, such as water and oxygen, are sufficiently removed, or in the state of suspension or slurry in the solvent. Examples of the solvent used in this case are aliphatic hydrocarbon solvents such as butane, pentane, hexane, heptane and octane, aromatic hydrocarbon solvents such as benzene and toluene, and halogenated hydrocarbons such as methylene chloride, and aliphatic hydrocarbon solvents and aromatic hydrocarbon solvents are preferred.

The method for homopolymerization of ethylene using the catalyst components for ethylene polymerization of the present invention is also not particularly limited, and gas phase polymerization in gaseous monomer, slurry polymerization using a solvent, etc. can be employed. Ethylene per se can be used as a solvent (bulk polymerization). The polymerization method can be either batch-wise polymerization or continuous polymerization, and besides can be carried out in two or more stages differing in reaction condition. The polymerization time is generally optionally determined depending on the kind of desired olefin polymers and reactors, and usually a range of 1 minute to 20 hours can be employed. The catalyst component and monomer can be added to reactor by optional known methods and in optional order. For example, there may be employed a method of simultaneously adding each catalyst component and monomer, a method of consecutively adding them, etc. The catalyst components may be previously contacted in an inert atmosphere before they are contacted with monomer.

The solution polymerization and slurry polymerization can be carried out in accordance with known polymerization methods and polymerization conditions. A preferred polymerization method is to carry out the polymerization using a continuous type reactor to which monomer feeds, diluents, or the like are continuously added as occasion demands and from which a polymer product is continuously or at least periodically taken out. As the reactor, there may be used a loop reactor, an agitation reactor, and the like can be used. Moreover, there may be used a plurality of reactors differing in reaction conditions which are arranged in series and/or parallel.

The molecular weight of the ethylene homopolymer produced can be controlled by known means such as adjustment of temperature of reaction zone and introduction of hydrogen.

When hydrogen is used, it is preferred to reduce the amount of hydrogen added for increasing the value of terminal vinylidene group/terminal methyl group.

In polymerization, an inert gas or the like may be allowed to coexist in the mixed gas.

As the conditions for solution polymerization and slurry polymerization, the temperature is usually from −30° C. to +150° C., preferably from 0 to 100° C., more preferably from 0 to 80° C. The polymerization activity can be enhanced and the value of terminal vinylidene group/terminal methyl group can be increased by carrying out the polymerization at higher temperatures. Furthermore, the molecular weight of the resulting ethylene homopolymer can be increased by carrying out the polymerization at lower temperatures.

The solvents used for solution polymerization and slurry polymerization include, for example, saturated hydrocarbon solvents such as butane, pentane, hexane, heptane and octane, aromatic hydrocarbon solvents such as benzene and toluene, and halogenated hydrocarbon solvents such as methylene chloride.

The gas phase polymerization can be carried out in accordance with known gas phase polymerization method and polymerization conditions. As the gas phase polymerization reactor, there is used a fluidized bed type reaction tank, preferably a fluidized bed type reaction tank having enlarged part. A reactor provided with an agitating element in the reaction tank may be used.

As the diluents, there may be used, for example, inert diluents such as paraffin, cycloparaffin and aromatic hydrocarbons.

The temperature of reaction zone of polymerization reactors in gas phase polymerization is usually from 0 to 150° C., preferably from 30 to 100° C. In polymerization, an inert gas or the like may be allowed to coexist in the mixed gas. The polymerization activity can be enhanced and the value of terminal vinylidene group/terminal methyl group of the resulting ethylene homopolymer can be increased by carrying out the polymerization at higher temperatures. Furthermore, the molecular weight of the resulting ethylene homopolymer can be increased by carrying out the polymerization at lower temperatures.

The partial pressure of ethylene in the polymerization is usually 0.01-10 MPa. For enhancing polymerization activity, the partial pressure is preferably 0.02 MPa or higher, more preferably 0.05 MPa or higher. For increasing the number of ethyl branches of the resulting ethylene homopolymer, it is preferably 5 MPa or lower, more preferably 2 MPa or lower, further preferably 1 MPa or lower.

In the present invention, a preliminary polymerization may be carried out before the above-mentioned polymerization (final polymerization).

The catalyst component for polymerization of ethylene of the present invention is obtained by contacting the above-mentioned component (A) and component (B), and the component (C) as an optional component. The amount of the component (A) used is usually 0.000001-0.002 mol, preferably 0.00001-0.002 mol for 1 g of the component (B) for enhancing polymerization activity.

The amount of the component (C) used is usually 100000 or less, and preferably 10000 or less as molar ratio of component (C) to component (A) ((C)/(A)) for increasing the number of ethyl branch of the resulting ethylene homopolymer.

When an organoaluminumoxy compound is used as the component (B) in the solution polymerization and slurry polymerization, the total concentration of the component (B) and the component (C) based on the solvent is usually 10 mmol/L or less, and for increasing the value of terminal vinylidene group/terminal methyl group, it is preferably 8 mmol/L or less, more preferably 6 mmol/L or less, further preferably 4 mmol/L or less, most preferably 2 mmol/L or less.

When a boron compound is used as the component (B) in the solution polymerization and slurry polymerization, the concentration of the component (C) based on the solvent is usually 10 mmol/L or less, and for increasing the value of terminal vinylidene group/terminal methyl group, it is preferably 8 mmol/L or less, more preferably 6 mmol/L or less, further preferably 4 mmol/L or less, most preferably 2 mmol/L or less.

The proportion of the meso-metallocene compound in metallocene compounds is usually 95% by weight or more, preferably 97% by weight or more, more preferably 99% by weight or more.

The meso-metallocene compound can be obtained by the process such as recrystallization. Further, the proportion of the meso-metallocene compound in metallocene compounds can usually be obtained by an analytical method such as NMR.

For example, analysis value of $^1$H-NMR of meso-dimethylsilylenebis(1-indenyl)zirconium dichloride which is one of meso-metallocene compounds is mentioned in Non-Patent Document 2.

If necessary, the ethylene homopolymer of the present invention may contain known additives such as, for example, foaming agent, foaming assistant, crosslinking agent, crosslinking assistant, antioxidant, weathering agent, lubricant, antiblocking agent, antistatic agent, anti-fogging agent, anti-dripping agent, pigment, and filler.

The ethylene homopolymer of the present invention can be molded by known molding methods, for example, extrusion molding methods such as inflation film molding method and T-die film molding method, injection molding method, compression molding method, extrusion foaming method, atmospheric foaming method, and pressure foaming agent.

Moldings can be obtained using the ethylene homopolymer of the process of the present invention. The moldings include, for example, pipes, tubes, containers, caps, films and sheets.

EXAMPLES

The present invention will be explained using the following examples and comparative examples.

(1) Intrinsic Viscosity ([η], Unit: dl/g)

A tetralin solution in which 2,6-di-t-butyl-p-cresol (BHT) is dissolved at a concentration of 0.5 g/L (hereinafter referred to as blank solution) and a solution prepared by dissolving ethylene polymer in the blank solution at a concentration of 1 mg/ml (hereinafter referred to as sample solution) were prepared. The falling time of the blank solution and the sample solution at 135° C. were measured by Ubbellohde viscometer, and relative viscosity [v rel] at 135° C. was obtained from the falling time. Then, the intrinsic viscosity [α] was calculated from the following formula.

$$[\eta]=23.3\times\log(\eta rel)$$

(2) The Number of Ethyl Branch (Carbon Atom Number 2) (Unit: 1/1000C)

The number of ethyl branch was obtained by measuring carbon nuclear magnetic resonance spectrum ($^{13}$C-NMR) by the carbon nuclear magnetic resonance method under the following conditions and carrying out calculation by the following calculation method.

<Measuring Conditions>

Apparatus: AVANCE 600 manufactured by Bruker Co., Ltd.

Measuring probe: 10 mm probe

Measuring solvent: Mixed solution of 1,2-dichlorobenzene/1,2-dichlorobenzene-d4=75/25 (volume ratio)

Measuring temperature: 130° C.

Measuring method: Proton decoupling method

Pulse width: 45°

Pulse repeating time: 4 seconds

Measuring standard: Tetramethylsilane

Window function: Positive exponential function

The number of integration: Integration was conducted until SN ratio of peaks observed at 32.0-32.2 ppm reached 100 or more. As for the standard of noise, the area of 50-60 ppm was defined to be noise.

<Method for Calculation of the Number of Ethyl Branches>

When the sum total of integral values of all peaks observed at 5-50 ppm was assumed to be 1000, the sum of integral values of peaks observed at 39.5-40.0 ppm and integral values of peaks observed at 37.1-37.6 ppm was taken as the number of ethyl branch.

<Method for Calculation of the Number of Other Alkyl Branches>

When the sum total of integral values of all peaks observed at 5-50 ppm was assumed to be 1000, the integral value of peaks observed at 19-20 ppm was taken as the number of methyl branches, the integral value of peaks observed at 14.3-14.8 ppm was taken as the number of propyl branches, and the sum total of integral values of peaks observed at 38.0-38.5 ppm was taken as the number of branches of 4 or more carbon atoms.

(3) The Value of the Ratio of Terminal Vinylidene Group and Terminal Methyl Group The value was obtained by measuring carbon nuclear magnetic resonance spectrum ($^{13}$C-NMR) by carbon nuclear magnetic resonance method under the following conditions and carrying out calculation by the following calculation method.

<Measuring Conditions>

Apparatus: AVANCE 600 manufactured by Bruker Co., Ltd.

Measuring probe: 10 mm probe

Measuring solvent: Mixed solution of 1,2-dichlorobenzene/1,2-dichlorobenzene-d4=75/25 (volume ratio)

Measuring temperature: 130° C.

Measuring method: Proton decoupling method

Pulse width: 45°

Pulse repeating time: 4 seconds

Measuring standard: Tetramethylsilane

Window function: Positive exponential function

The number of integration: Integration was conducted until SN ratio of peaks observed at 32.0-32.2 ppm reached 100 or more. As for the standard of noise, the area of 50-60 ppm is defined to be noise.

<Method of Calculation>

The integral value of peaks observed at 36.4-36.6 ppm was taken as terminal vinylidene group, and the integral value of peaks observed at 32.0-32.2 ppm was taken as terminal methyl group, and the value of terminal vinylidene group/terminal methyl group was obtained.

(4) The Values of Terminal Vinyl Group/Terminal Unsaturated Group, and Terminal Vinylene Group/Unsaturated Terminal Group The values were obtained by measuring proton nuclear magnetic resonance spectrum ($^1$H-NMR) by proton nuclear magnetic resonance method under the following conditions and carrying out calculation by the following calculation method.

<Measuring Conditions>

Apparatus: EX270 manufactured by Nippon Denshi Co., Ltd.

Measuring probe: 5 mm probe

Measuring solvent: 1,2-dichlorobenzene-d4

Measuring sample concentration: 0.5 ml of measuring solvent for 10 mg of polymer
Measuring temperature: 130° C.
Pulse width: 30°
Pulse repeating time: 7 seconds
Measuring standard: Tetramethylsilane
The number of integration: 64 times
<Method of Calculation>
The integral value of peaks observed at 4.86-5.02 ppm was taken as terminal vinyl group, and sum of the integral values of peaks observed at 4.64-4.80 ppm (vinylidene), 4.86-5.02 ppm (vinyl), 5.30-5.53 (trans-vinylene) was taken as terminal unsaturated group, and the value of terminal vinyl group/terminal unsaturated group was obtained.

Furthermore, the integral value of peaks observed at 5.30-5.53 ppm was taken as terminal vinylene group and sum of the integral values of peaks observed at 4.64-4.80 ppm (vinylidene), 4.86-5.02 ppm (vinyl), 5.30-5.53 (trans-vinylene) was taken as terminal unsaturated group, and the value of terminal vinylene group/terminal unsaturated group was obtained.

(5) The Proportion of meso-dimethylsilylenebis(1-indenyl)zirconium dichloride in Metallocene Compounds In the light of Non-Patent Document 2, the proportion was obtained by measuring proton nuclear magnetic resonance spectrum ($^1$H-NMR) by proton nuclear magnetic resonance method under the following conditions.

<Measuring Conditions>
Apparatus: EX270 manufactured by Nippon Denshi Co., Ltd.
Measuring probe: 5 mm probe
Measuring solvent: chloroform-d1
Concentration of measuring sample: 0.5 ml of measuring solvent based on 10 mg of sample
Measuring temperature: 25° C.
Pulse width: 30°
Pulse repeating time: 5 seconds
Measuring standard: As for the standard of chemical shift value, the peak of chloroform was assumed to be at 7.24 ppm.
The number of integration: 8 times Example 1

(1) Polymerization

The inner space of an autoclave of 5 liters with an agitator subjected to replacement with argon after vacuum drying was made vacuous, and 1200 g of butane was charged therein, followed by raising the temperature in the system to 50° C. and then introducing ethylene at a partial pressure of 0.1 MPa to stabilize the system. Therein was introduced 0.55 mL of a hexane solution of methylaluminoxane (PMAO-s manufactured by Tosoh Finechem Co., Ltd.) having a methylaluminoxane concentration of 2.79 mmol/mL (methylaluminoxane concentration based on solvent was 0.8 mmol/L). Then, therein was introduced 3 mL of a toluene solution of meso-dimethylsilylenebis(1-indenyl)zirconium dichloride having a meso-dimethylsilylenebis (1-indenyl)zirconium dichloride concentration of 2 μmol/mL. Polymerization was carried out at 50° C. for 240 minutes while continuously feeding ethylene gas so as to maintain the total pressure at constant during polymerization. Thereafter, butane and ethylene were purged to obtain 9.8 g of an ethylene polymer. The resulting ethylene homopolymer had a [η] of 0.63, contained only ethyl branch as alkyl branch observed in measurement of $^{13}$C-NMR, and had a number of ethyl branch of 14.6 (/100° C.). The ratio of terminal vinylidene group/terminal methyl group calculated from $^{13}$C-NMR was 0.97. The peak observed at 4.0-6.5 ppm in $^1$H-NMR was only 4.7 ppm originating from the vinylidene structure, and the value of terminal vinyl group/terminal unsaturated group was 0, and the value of terminal vinylene group/terminal unsaturated group was 0.

When $^1$H-NMR was measured on meso-dimethylsilylenebis(1-indenyl)zirconium dichloride used for polymerization was measured, compounds other than meso-dimethylsilylenebis(1-indenyl)zirconium dichloride could not be confirmed.

Example 2

(1) Polymerization

The inner space of an autoclave of 5 liters with an agitator subjected to replacement with argon after vacuum drying was made vacuous, and 1200 g of butane was charged therein, followed by raising the temperature in the system to 50° C. and then introducing ethylene at a partial pressure of 0.1 MPa to stabilize the system. Therein was introduced 2.2 mL of a hexane solution of methylaluminoxane (PMAO-s manufactured by Tosoh Finechem Co., Ltd.) having a methylaluminoxane concentration of 2.72 mmol/mL (methylaluminoxane concentration based on solvent was 3.0 mmol/L). Then, therein was introduced 3 mL of a toluene solution of meso-dimethylsilylenebis(1-indenyl)zirconium dichloride having a meso-dimethylsilylenebis(1-indenyl)zirconium dichloride concentration of 2 mmol/mL. Polymerization was carried out at 50° C. for 240 minutes while continuously feeding ethylene gas so as to maintain the total pressure at constant during polymerization. Thereafter, butane and ethylene were purged to obtain 33.5 g of an ethylene polymer. The resulting ethylene homopolymer had a [α] of 0.58, contained only ethyl branch as alkyl branch observed in $^{13}$C-NMR measurement, and had a number of ethyl branch of 14.5 (/100° C.). The ratio of terminal vinylidene group/terminal methyl group calculated from $^{13}$C-NMR was 0.96.

The peak observed at 4.0-6.5 ppm in $^1$H-NMR was only 4.7 ppm originating from the vinylidene structure, and the value of terminal vinyl group/terminal unsaturated group was 0, and the value of terminal vinylene group/terminal unsaturated group was 0.

When $^1$H-NMR was measured on meso-dimethylsilylenebis(1-indenyl)zirconium dichloride used for polymerization was measured, compounds other than meso-dimethylsilylenebis(1-indenyl)zirconium dichloride could not be confirmed.

Example 2

Comparative Example 1

(1) Polymerization

The inner space of an autoclave of 5 liters with an agitator subjected to replacement with argon after vacuum drying was made vacuous, and 1200 g of butane was charged therein, followed by raising the temperature in the system to 50° C. and then introducing ethylene at a partial pressure of 0.1 MPa to stabilize the system. Therein was introduced 11.0 mL of a hexane solution of methylaluminoxane (PMAO-s manufactured by Tosoh Finechem Co., Ltd.) having a methylaluminoxane concentration of 2.72 mmol/mL (methylaluminoxane concentration based on solvent was 15.0 mmols/L). Then, therein was introduced 3 mL of a toluene solution of meso-dimethylsilylenebis(1-indenyl)zirconium dichloride having a meso-dimethylsilylenebis(1-indenyl)zirconium dichloride concentration of 2 μmol/mL. Polymerization was carried out at 50° C. for 240 minutes while continuously feeding ethylene gas so as to maintain the total pressure at constant during polymerization. Thereafter, butane and ethylene were purged to obtain 33.5 g of an ethylene polymer. The resulting ethylene homopolymer had a [η] of 0.66, contained only ethyl branch as alkyl branch observed in $^{13}$C-NMR measurement, and had a number of ethyl branch of 14.4 (/100° C.). The ratio of terminal vinylidene group/terminal methyl group calculated from $^{13}$C-NMR was 0.87.

The peak observed at 4.0-6.5 ppm in $^1$H-NMR was only 4.7 ppm originating from the vinylidene structure, and the value of terminal vinyl group/terminal unsaturated group was 0, and the value of terminal vinylene group/terminal unsaturated group was 0.

When $^1$H-NMR was measured on meso-dimethylsilylenebis(1-indenyl)zirconium dichloride used for polymerization was measured, compounds other than meso-dimethylsilylenebis(1-indenyl)zirconium dichloride could not be confirmed.

Referential Example 1

Values of an ethylene-based copolymer commercially available (Sumikathene-L FS240 manufactured by Sumitomo Chemical Co., Ltd.) are shown.

[η] was 1.5. The copolymer contained only ethyl branch as alkyl branch observed in $^{13}$C-NMR measurement, and had a number of ethyl branch of 20.3 (/10000). Peaks originating from terminal vinylidene group in $^{13}$C-NMR measurement were not observed. The ratio of terminal vinylidene group/terminal methyl group was 0. The peaks originating from terminal unsaturated group at 4.0-6.5 ppm in $^1$H-NMR were not observed.

The invention claimed is:

1. An ethylene homopolymer which satisfies the following requirements (1)-(4):
    (1) the number of ethyl branch per 1000 carbon atoms is 8 or more,
    (2) the number of each of alkyl branches other than ethyl branch is 0.1 or less,
    (3) the proportions of terminal vinyl group and terminal vinylene group in terminal unsaturated group (sum of terminal vinyl group, terminal vinylene group and terminal vinylidene group) are as shown by terminal vinyl group/terminal unsaturated group<0.01 and terminal vinylene group/terminal unsaturated group<0.01, and
    (4) the ratio of terminal vinylidene group and terminal methyl group is terminal vinylidene group/terminal methyl group>0.90.

2. An ethylene homopolymer according to claim 1, wherein the terminal vinylidene group is terminal ethylvinylidene group.

* * * * *